(12) United States Patent
Lee

(10) Patent No.: US 11,285,817 B2
(45) Date of Patent: Mar. 29, 2022

(54) SYSTEM AND METHOD FOR SETTING REGENERATIVE BRAKING VALUE

(71) Applicant: CEVO MOBILITY CORP., Jeollanam-do (KR)

(72) Inventor: Chung Woo Lee, Suwon-si (KR)

(73) Assignee: CEVO MOBILITY CORP., Yeonggwang-Gun (KR)

(*) Notice: Subject to any disclaimer, the term of this patent is extended or adjusted under 35 U.S.C. 154(b) by 357 days.

(21) Appl. No.: 16/534,478

(22) Filed: Aug. 7, 2019

(65) Prior Publication Data
US 2021/0001728 A1    Jan. 7, 2021

(30) Foreign Application Priority Data

Jul. 3, 2019  (KR) .................. 10-2019-0079951

(51) Int. Cl.
| | | |
|---|---|---|
| *B60L 7/18* | (2006.01) | |
| *B60L 7/26* | (2006.01) | |
| *B60W 30/18* | (2012.01) | |
| *B60W 40/10* | (2012.01) | |

(52) U.S. Cl.
CPC .............. *B60L 7/18* (2013.01); *B60L 7/26* (2013.01); *B60W 30/18127* (2013.01); *B60W 40/10* (2013.01)

(58) Field of Classification Search
None
See application file for complete search history.

(56) References Cited

U.S. PATENT DOCUMENTS

2017/0297547 A1* 10/2017 Goto ..................... B60T 7/12
2018/0043896 A1*  2/2018 Lee ..................... B60W 10/06

OTHER PUBLICATIONS

J. Paterson and M. Ramsay, "Electric vehicle braking by fuzzy logic control," Conference Record of the 1993 IEEE Industry Applications Conference Twenty-Eighth IAS Annual Meeting, 1993, pp. 2200-2204 vol. 3, doi: 10.1109/IAS.1993.299173. (Year: 1993).*

* cited by examiner

*Primary Examiner* — Todd Melton
*Assistant Examiner* — Jason R Roberson
(74) *Attorney, Agent, or Firm* — United One Law Group LLC; Kongsik Kim; Jhongwoo Peck

(57) ABSTRACT

A system and method for setting a regenerative braking value are disclosed. The disclosed system may include: a first measurement unit configured to measure the displacement information of a brake pedal of an electric vehicle; a second measurement unit configured to measure the speed of the electric vehicle; a third measurement unit configured to measure the distance from the electric vehicle to an object in front of the electric vehicle; a first computation unit configured to compute the brake force required for a deceleration of the electric vehicle by inputting the displacement information and the speed into a first fuzzy logic algorithm; and a second computation unit configured to compute the regenerative braking value by applying the brake force and the distance to the object to a second fuzzy logic algorithm.

9 Claims, 6 Drawing Sheets

SYSTEM AND METHOD FOR SETTING REGENERATIVE BRAKING VALUE

CROSS-REFERENCE TO RELATED APPLICATIONS

This application claims the benefit of Korean Patent Application No. 10-2019-0079951, filed with the Korean Intellectual Property Office on Jul. 3, 2019, the disclosure of which is incorporated herein by reference in its entirety.

BACKGROUND

1. Technical Field

Embodiments of the present invention relate to a system and method for setting a regenerative braking value effectively in an ultra-small electric vehicle.

2. Description of the Related Art

Regenerative braking is a technology used for maximizing the mileage of a vehicle, where the kinetic energy generated during braking is used to apply a reverse torque on an electric motor to generate electrical energy, and the generated electrical energy is stored in a high-voltage battery to be reused when operating the vehicle. Regenerative braking technology is applied to environment-friendly vehicles such as electric vehicles, hybrid vehicles, and the like.

A conventional electric vehicle uses an ESC (electronic stability control) system, which measures the force of the brake and variably sets and applies the regenerative braking value based on the measured force of the brake and the speed of the electric vehicle.

However, an ultra-small electric vehicle based on the related art is not equipped with an ESC system and thus cannot measure the force of the brake. Therefore, the ultra-small electric vehicle based on the related art uses a fixed regenerative braking value. Alternatively, the ultra-small electric vehicle based on the related art predicts the brake force by measuring the displacement of the brake pedal and uses this to apply a variable regenerative braking value.

However, using a fixed regenerative braking value entails the drawback of lowered efficiency. Also, when a variable regenerative braking value based on a predicted brake force is used, it is difficult to set the regenerative braking value effectively, as only the information regarding the brake pedal displacement is used.

SUMMARY OF THE INVENTION

To resolve the problems of the related art described above, an aspect of the invention provides a method and device with which the regenerative braking value can be set effectively.

Other objectives can be derived by the skilled person from the embodiments of the invention set forth below.

To achieve the objectives above, an embodiment of the invention provides a system for setting a regenerative braking value, where the system includes: a first measurement unit configured to measure the displacement information of a brake pedal of an electric vehicle; a second measurement unit configured to measure the speed of the electric vehicle; a third measurement unit configured to measure the distance from the electric vehicle to an object in front of the electric vehicle; a first computation unit configured to compute the brake force required for a deceleration of the electric vehicle by inputting the displacement information and the speed into a first fuzzy logic algorithm; and a second computation unit configured to compute the regenerative braking value by applying the brake force and the distance to the object to a second fuzzy logic algorithm.

The first computation unit can compute the displacement information into a first fuzzy variable, convert the speed into a second fuzzy variable, compute a first fuzzy output from the first fuzzy variable and the second fuzzy variable by using a pre-inputted first fuzzy inference rule, and compute the brake force by way of a defuzzification of the first fuzzy output.

The second computation unit can convert the brake force into a third fuzzy variable, convert the distance to the object into a fourth fuzzy variable, compute a second fuzzy output from the third fuzzy variable and the fourth fuzzy variable by using a pre-inputted second fuzzy inference rule, and compute the regenerative braking value by way of a defuzzification of the second fuzzy output.

The second fuzzy inference rule can be defined as in the table shown below:

|  |  | brake force | | | | | | |
|---|---|---|---|---|---|---|---|---|
|  |  | nb | ns | nm | ze | pm | ps | pb |
| distance | nb | ns | ns | ns | ns | ns | ns | ns |
|  | ns | nm | nm | nm | nm | nm | nm | nm |
|  | nm | nm | ze | ze | ze | ze | ze | ze |
|  | ze | ze | ze | pm | pm | pm | pm | pm |
|  | pm | pm | pm | pm | ps | ps | ps | ps |
|  | ps | ps | ps | ps | ps | pb | pb | pb |
|  | pb | pb | pb | pb | pb | pb | pb | pb | where 'brake force' represents the value of the brake force, 'distance' represents the distance to the object, 'nb' represents 'negative big', 'ns' represents 'negative small', 'nm' represents 'negative medium', 'ze' represents 'zero', 'pb' represents 'positive big', 'pm' represents 'positive medium', and 'ps' represents 'positive small'.

The x-axis of a membership function of the brake force can have normalized values; 'nb' for the brake force can have a y value of 1 in the 0~0.1 section of the x-axis, a y value dropping from 1 to 0 in the 0.1~0.2 section of the x-axis, and a y value of 0 in the 0.2~1 section of the x-axis; 'ns' for the brake force can have a y value rising from 0 to 1 in the 0~0.1 section of the x-axis, a y value of 1 in the 0.1~0.4 section of the x-axis, a y value dropping from 1 to 0 in the 0.4~0.5 section of the x-axis, and a y value of 0 in the 0.5~1 section of the x-axis; 'nm' for the brake force can have a y value of 0 in the 0~0.2 section of the x-axis, a y value rising from 0 to 1 in the 0.2~0.3 section of the x-axis, a y value of 1 in the 0.3~0.5 section of the x-axis, a y value dropping from 1 to 0 in the 0.5~0.6 section of the x-axis, and a y value of 0 in the 0.6~1 section of the x-axis; 'ze' for the brake force can have a y value of 0 in the 0~0.3 section of the x-axis, a y value rising from 0 to 1 in the 0.3~0.4 section of the x-axis, a y value of 1 in the 0.4~0.6 section of the x-axis, a y value dropping from 1 to 0 in the 0.6~0.7 section of the x-axis, and a y value of 0 in the 0.7~1 section of the x-axis; 'pm' for the brake force can have a y value of 0 in the 0~0.4 section of the x-axis, a y value rising from 0 to 1 in the 0.4~0.5 section of the x-axis, a y value of 1 in the 0.5~0.7 section of the x-axis, a y value dropping from 1 to 0 in the 0.7~0.8 section of the x-axis, and a y value of 0 in the 0.8~1 section of the x-axis; 'ps' for the brake force can have a y value of 0 in the 0~0.5 section of the x-axis, a y value rising from 0 to 1 in the 0.5~0.6 section of the x-axis, a y value of 1 in the 0.6~0.8 section of the x-axis, a y value dropping from 1 to 0 in the 0.8~0.9 section of the x-axis, and a y value of 0 in the 0.9~1 section of the x-axis; and 'pb' for the brake force can have a y value of 0 in the 0~0.6 section of the x-axis, a y value rising from 0 to 1 in the 0.6~0.7 section of the x-axis, and a y value of 1 in the 0.7~1 section of the x-axis.

The x-axis of a membership function of the distance to the object has normalized values; 'nb' for the distance to the object can have a y value of 1 in the 0~0.1 section of the x-axis, a y value dropping from 1 to 0 in the 0.1~0.2 section of the x-axis, and a y value of 0 in the 0.2~1 section of the x-axis; 'ns' for the distance to the object can have a y value rising from 0 to 1 in the 0~0.1 section of the x-axis, a y value of 1 in the 0.1~0.4 section of the x-axis, a y value dropping from 1 to 0 in the 0.4~0.5 section of the x-axis, and a y value of 0 in the 0.5~1 section of the x-axis; 'nm' for the distance to the object can have a y value of 0 in the 0~0.1 section of the x-axis, a y value rising from 0 to 1 in the 0.1~0.2 section of the x-axis, a y value of 1 in the 0.2~0.5 section of the x-axis, a y value dropping from 1 to 0 in the 0.5~0.6 section of the x-axis, and a y value of 0 in the 0.6~1 section of the x-axis; 'ze' for the distance to the object can have a y value of 0 in the 0~0.2 section of the x-axis, a y value rising from 0 to 1 in the 0.2~0.3 section of the x-axis, a y value of 1 in the 0.3~0.6 section of the x-axis, a y value dropping from 1 to 0 in the 0.6~0.7 section of the x-axis, and a y value of 0 in the 0.7~1 section of the x-axis; 'pm' for the distance to the object can have a y value of 0 in the 0~0.3 section of the x-axis, a y value rising from 0 to 1 in the 0.3~0.4 section of the x-axis, a y value of 1 in the 0.4~0.7 section of the x-axis, a y value dropping from 1 to 0 in the 0.7~0.8 section of the x-axis, and a y value of 0 in the 0.8~1 section of the x-axis; 'ps' for the distance to the object can have a y value of 0 in the 0 0.4 section of the x-axis, a y value rising from 0 to 1 in the 0.4~0.5 section of the x-axis, a y value of 1 in the 0.5~0.8 section of the x-axis, a y value dropping from 1 to 0 in the 0.8~0.9 section of the x-axis, and a y value of 0 in the 0.9~1 section of the x-axis; and 'pb' for the brake force can have a y value of 0 in the 0~0.5 section of the x-axis, a y value rising from 0 to 1 in the 0.5~0.6 section of the x-axis, and a y value of 1 in the 0.6~1 section of the x-axis.

Another embodiment of the invention provides a method of setting a regenerative braking value, where the method includes: measuring the displacement information of a brake pedal of an electric vehicle; measuring the speed of the electric vehicle; measuring the distance from the electric vehicle to an object in front of the electric vehicle; computing the brake force required for a deceleration of the electric vehicle by inputting the displacement information and the speed into a first fuzzy logic algorithm; and computing the regenerative braking value by applying the brake force and the distance to the object to a second fuzzy logic algorithm.

According to certain embodiments of the invention, the regenerative braking value for an ultra-small electric vehicle can be set in an effective manner.

It is to be appreciated that the advantageous effects of the present invention are not limited to the effect described above but rather encompass all advantageous effects that can be derived from the detailed description of the invention or the elements of the invention set forth in the scope of claims.

DETAILED DESCRIPTION OF THE INVENTION

Figure 1:
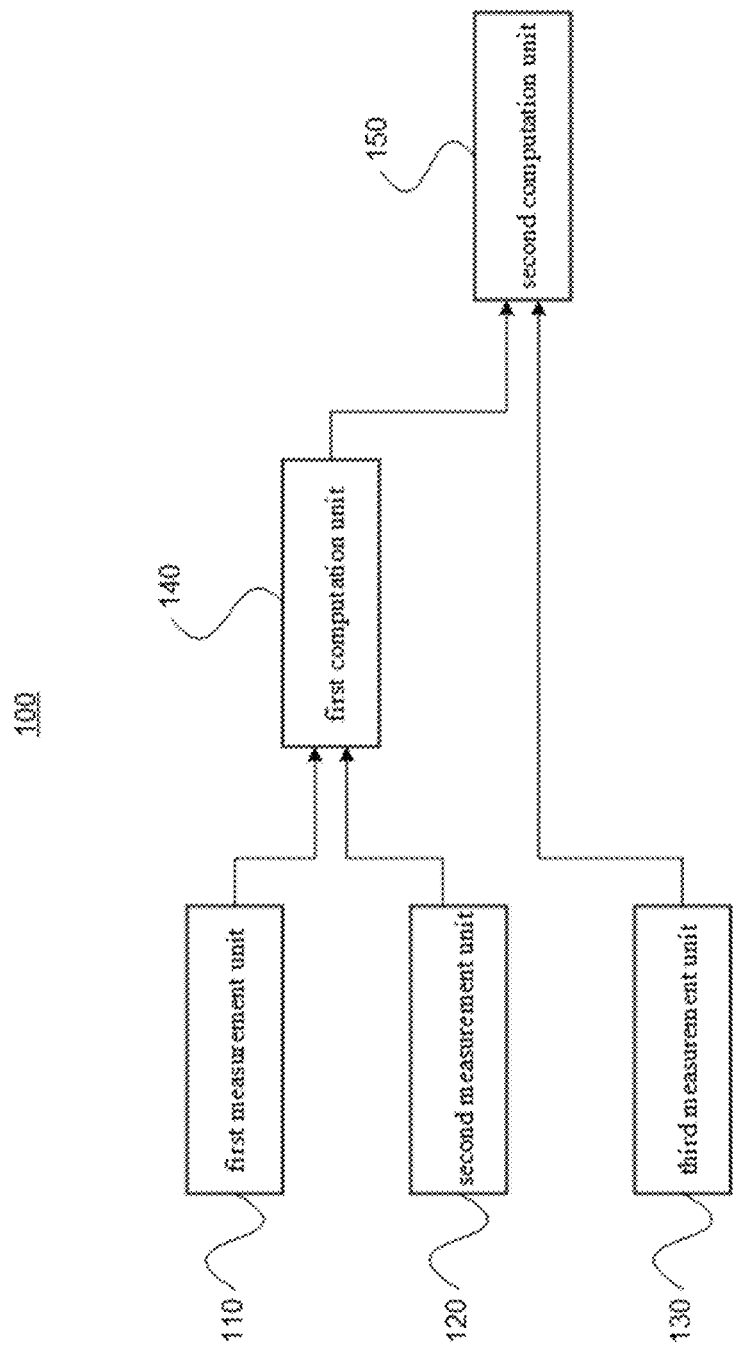
FIG. 1 schematically illustrates the composition of a system for setting a regenerative braking value according to an embodiment of the invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, similar reference numerals are assigned to similar elements.

While such terms as "first" and "second," etc., may be used to describe various elements, such elements must not be limited to the above terms. The above terms are used only to distinguish one element from another. For example, a first element may be referred to as a second element without departing from the scope of rights of the present invention, and likewise a second element may be referred to as a first element. The term "and/or" encompasses both combinations of the plurality of related items disclosed and any item from among the plurality of related items disclosed.

When an element is mentioned is being "connected" or "coupled" to another element, it is to be understood that, while the element can be directly connected or coupled to the other element, it is also possible that another element may be positioned in-between. On the other hand, if an element is mentioned as being "directly connected" or "directly coupled" to another element, it is to be understood that there are no other elements in-between.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless defined otherwise, all terms used herein, including technical or scientific terms, have the same meanings as those generally recognized by the person having ordinary skill in the relevant field of art. Terms such as those that are defined in generally used dictionaries are to be interpreted as having meanings that agree with the context of the relevant technology and are not to be interpreted as having idealistic or excessively formal meanings unless clearly defined within the specification.

Certain embodiments of the invention are described below in more detail with reference to the accompanying drawings.

FIG. 1 schematically illustrates the composition of a system for setting a regenerative braking value according to an embodiment of the invention.

Referring to FIG. 1, the system 100 may be provided within an electric vehicle and may include a first measurement unit 110, a second measurement unit 120, a third measurement unit 130, a first computation unit 140, and a second computation unit 150.

A more detailed description of the function of each element is provided as follows.

The first measurement unit 110 may be arranged adjacent to the brake pedal of the electric vehicle and may measure the displacement information of the brake pedal.

Here, the displacement information of the brake pedal can correspond to information associated with the angle of the brake pedal when the user steps on the brake pedal.

The second measurement unit 120 may measure the speed of the electric vehicle.

Here, the second measurement unit 120 may measure the speed of the electric vehicle by receiving the speed information from a speedometer unit installed by default in the electric vehicle.

The third measurement unit 130 may measure the distance from the electric vehicle to an object present in front of the electric vehicle.

Here, the object can be another vehicle or an obstacle.

Also, the third measurement unit 130 can include a radar device or a lidar device and can measure the distance to the object based on the device.

The first computation unit 140 and the second computation unit 150 can be processor-based modules. Here, the processor can include one or more of a central processing unit, an application processor, and a communication processor.

The first computation unit 140 may compute the brake force required for decelerating the electric vehicle by using the information associated with the displacement of the brake pedal and the speed of the electric vehicle.

According to an embodiment of the invention, the first computation unit 140 can measure the brake force required for the deceleration of the electric vehicle by using a preset data table or a pre-defined formula and can, for example, compute the brake force required decelerating the electric vehicle by inputting the displacement information of the brake pedal and the speed of the electric vehicle into a first fuzzy logic algorithm.

Fuzzy logic is a mathematical theory that establishes a conceptual and abstract expression into a scientific theorem. A fuzzy set defines the degree of membership of an arbitrary element in an arbitrary set by way of a membership function. As fuzzy logic is known to the skilled person, further details on this matter is omitted.

When using a first fuzzy logic algorithm, the first computation unit 140 can convert the displacement information of the brake pedal into a first fuzzy variable, convert the speed of the electric vehicle into a second fuzzy variable, compute a first fuzzy output from the first fuzzy variable and second fuzzy variable by using a first fuzzy inference rule inputted beforehand, and compute the brake force by defuzzifying the first fuzzy output.

The second computation unit 150 may compute the regenerative braking value by applying the brake force and the distance to the object in a second fuzzy logic algorithm.

Here, the second computation unit 150 can convert the brake force into a third fuzzy variable, convert the distance of the object into a fourth fuzzy variable, compute a second fuzzy output from the third fuzzy variable and fourth fuzzy variable by using a second fuzzy inference rule inputted beforehand, and compute the regenerative braking value by defuzzifying the second fuzzy output.

According to an embodiment of the invention, the second fuzzy inference rule can be defined as Table 1 shown below.

TABLE 1

|  |  | brake force | | | | | | |
| --- | --- | --- | --- | --- | --- | --- | --- | --- |
|  |  | nb | ns | nm | ze | pm | ps | pb |
| distance | nb | ns | ns | ns | ns | ns | ns | ns |
|  | ns | nm | nm | nm | nm | nm | nm | nm |
|  | nm | nm | ze | ze | ze | ze | ze | ze |
|  | ze | ze | ze | pm | pm | pm | pm | pm |
|  | pm | pm | pm | pm | ps | ps | ps | ps |
|  | ps | ps | ps | ps | ps | pb | pb | pb |
|  | pb | pb | pb | pb | pb | pb | pb | pb |

Here, 'brake force' represents the value of the brake force, 'distance' represents the distance to the object, 'nb' represents 'negative big', 'ns' represents 'negative small', 'nm' represents 'negative medium', 'ze' represents 'zero', 'pb' represents 'positive big', 'pm' represents 'positive medium', and 'ps' represents 'positive small'.

For example, if the third fuzzy variable, which corresponds to the brake force, has the value 'nb' and the fourth fuzzy variable, which corresponds to the distance to the object, has the value 'pm', then the second fuzzy output would be computed as 'pm'.

In another example, if the third fuzzy variable corresponding to the brake force has the value 'ze' and the fourth fuzzy variable corresponding to the distance to the object has the value 'ns', then the second fuzzy output would be computed as 'nm'.

Figure 2:
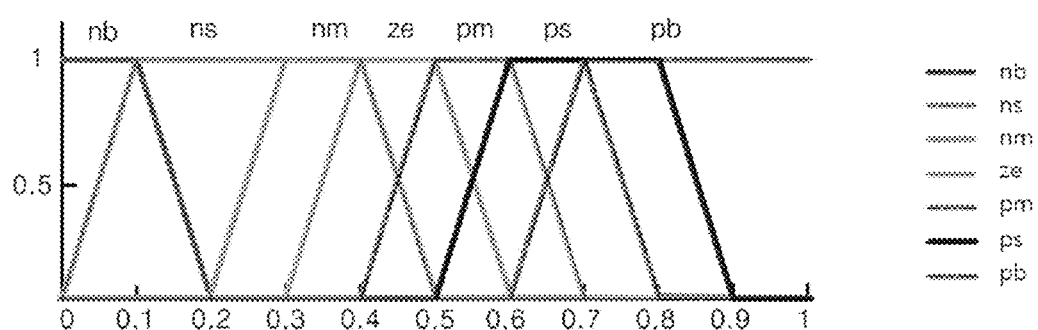
FIG. 2 illustrates a first membership function for the brake force according to an embodiment of the invention.
Figure 3:
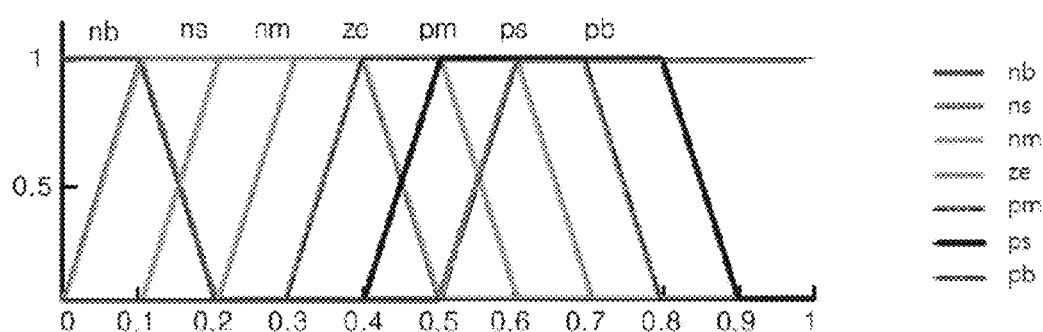
FIG. 3 illustrates a membership function for the distance to the object according to an embodiment of the invention.
Figure 4:
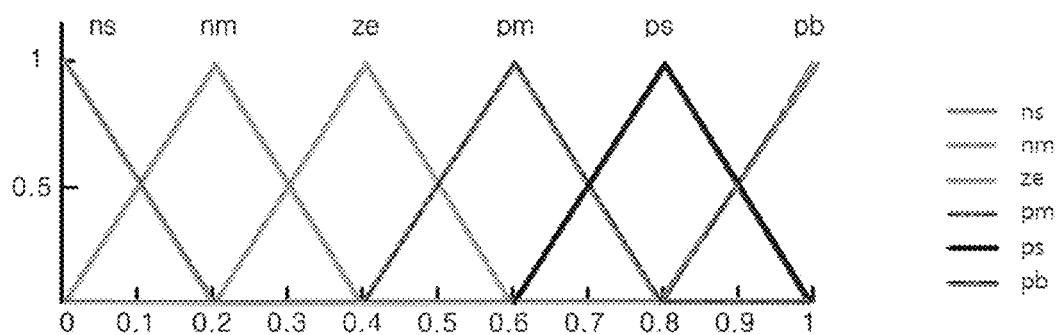
FIG. 4 illustrates a membership function for defuzzifying the results of applying a fuzzy rule into a regenerative output value according to an embodiment of the invention.

FIG. 2 illustrates a first membership function for the brake force according to an embodiment of the invention, FIG. 3 illustrates a membership function for the distance to the object according to an embodiment of the invention, and FIG. 4 illustrates a membership function for defuzzifying the results of applying a fuzzy rule into a regenerative output value according to an embodiment of the invention. A more detailed description of each figure is presented as follows.

First, referring to FIG. 2, the x-axis of the membership function for the brake force may have normalized values. Here, the membership function of the brake force may be represented as follows.

'nb' for the brake force may have a y value of 1 in the 0~0.1 section of the x-axis, a y value dropping from 1 to 0 in the 0.1~0.2 section of the x-axis, and a y value of 0 in the 0.2~1 section of the x-axis.

'ns' for the brake force may have a y value rising from 0 to 1 in the 0~0.1 section of the x-axis, a y value of 1 in the 0.1~0.4 section of the x-axis, a y value dropping from 1 to 0 in the 0.4~0.5 section of the x-axis, and a y value of 0 in the 0.5~1 section of the x-axis.

'nm' for the brake force may have a y value of 0 in the 0~0.2 section of the x-axis, a y value rising from 0 to 1 in the 0.2~0.3 section of the x-axis, a y value of 1 in the 0.3~0.5 section of the x-axis, a y value dropping from 1 to 0 in the 0.5~0.6 section of the x-axis, and a y value of 0 in the 0.6~1 section of the x-axis.

'ze' for the brake force may have a y value of 0 in the 0~0.3 section of the x-axis, a y value rising from 0 to 1 in the 0.3~0.4 section of the x-axis, a y value of 1 in the 0.4~0.6 section of the x-axis, a y value dropping from 1 to 0 in the 0.6~0.7 section of the x-axis, and a y value of 0 in the 0.7~1 section of the x-axis.

'pm' for the brake force may have a y value of 0 in the 0~0.4 section of the x-axis, a y value rising from 0 to 1 in the 0.4~0.5 section of the x-axis, a y value of 1 in the 0.5~0.7 section of the x-axis, a y value dropping from 1 to 0 in the 0.7~0.8 section of the x-axis, and a y value of 0 in the 0.8~1 section of the x-axis.

'ps' for the brake force may have a y value of 0 in the 0~0.5 section of the x-axis, a y value rising from 0 to 1 in the 0.5~0.6 section of the x-axis, a y value of 1 in the 0.6~0.8 section of the x-axis, a y value dropping from 1 to 0 in the 0.8~0.9 section of the x-axis, and a y value of 0 in the 0.9~1 section of the x-axis.

'pb' for the brake force may have a y value of 0 in the 0~0.6 section of the x-axis, a y value rising from 0 to 1 in the 0.6~0.7 section of the x-axis, and a y value of 1 in the 0.7~1 section of the x-axis.

Next, referring to FIG. 3, the x-axis of a membership function for the distance to the object may have normalized values. Here, the membership function of the distance to the object may be represented as follows.

'nb' for the distance to the object may have a y value of 1 in the 0~0.1 section of the x-axis, a y value dropping from 1 to 0 in the 0.1~0.2 section of the x-axis, and a y value of 0 in the 0.2~1 section of the x-axis.

'ns' for the distance to the object may have a y value rising from 0 to 1 in the 0~0.1 section of the x-axis, a y value of 1 in the 0.1~0.4 section of the x-axis, a y value dropping from 1 to 0 in the 0.4~0.5 section of the x-axis, and a y value of 0 in the 0.5~1 section of the x-axis.

'nm' for the distance to the object may have a y value of 0 in the 0~0.1 section of the x-axis, a y value rising from 0 to 1 in the 0.1~0.2 section of the x-axis, a y value of 1 in the 0.2~0.5 section of the x-axis, a y value dropping from 1 to 0 in the 0.5~0.6 section of the x-axis, and a y value of 0 in the 0.6~1 section of the x-axis.

'ze' for the distance to the object may have a y value of 0 in the 0~0.2 section of the x-axis, a y value rising from 0 to 1 in the 0.2~0.3 section of the x-axis, a y value of 1 in the 0.3~0.6 section of the x-axis, a y value dropping from 1 to 0 in the 0.6~0.7 section of the x-axis, and a y value of 0 in the 0.7~1 section of the x-axis.

'pm' for the distance to the object may have a y value of 0 in the 0~0.3 section of the x-axis, a y value rising from 0 to 1 in the 0.3~0.4 section of the x-axis, a y value of 1 in the 0.4~0.7 section of the x-axis, a y value dropping from 1 to 0 in the 0.7~0.8 section of the x-axis, and a y value of 0 in the 0.8~1 section of the x-axis.

'ps' for the distance to the object may have a y value of 0 in the 0~0.4 section of the x-axis, a y value rising from 0 to 1 in the 0.4~0.5 section of the x-axis, a y value of 1 in the 0.5~0.8 section of the x-axis, a y value dropping from 1 to 0 in the 0.8~0.9 section of the x-axis, and a y value of 0 in the 0.9~1 section of the x-axis.

'pb' for the brake force may have a y value of 0 in the 0~0.5 section of the x-axis, a y value rising from 0 to 1 in the 0.5~0.6 section of the x-axis, and a y value of 1 in the 0.6~1 section of the x-axis.

Next, referring to FIG. 4, the x-axis of a membership function for the defuzzification may have normalized values. Here, the membership function for the defuzzification may be represented as follows.

For 'ns', the value of y may drop from 1 to 0 in the 0~0.2 section of the x-axis, and the value of y may be 0 in the 0.2~1 section of the x-axis.

For 'nm', the value of y may rise from 0 to 1 in the 0~0.2 section of the x-axis, the value of y may drop from 1 to 0 in the 0.2~0.4 section of the x-axis, and the value of y may be 0 in the 0.4~1 section of the x-axis.

For 'ze', the value of y may be 0 in the 0~0.2 section of the x-axis, the value of y may rise from 0 to 1 in the 0.2~0.4 section of the x-axis, the value of y may drop from 1 to 0 in the 0.4~0.6 section of the x-axis, and the value of y may be 0 in the 0.6~1 section of the x-axis.

For 'pm', the value of y may be 0 in the 0~0.4 section of the x-axis, the value of y may rise from 0 to 1 in the 0.4~0.6 section of the x-axis, the value of y may drop from 1 to 0 in the 0.6~0.8 section of the x-axis, and the value of y may be 0 in the 0.8~1 section of the x-axis.

For 'ps', the value of y may be 0 in the 0~0.6 section of the x-axis, the value of y may rise from 0 to 1 in the 0.6~0.8 section of the x-axis, and the value of y may drop from 1 to 0 in the 0.8~1 section of the x-axis.

For 'pb', the value of y may be 0 in the 0~0.8 section of the x-axis, and the value of y may rise from 0 to 1 in the 0.8~1 section of the x-axis.

Figure 5:
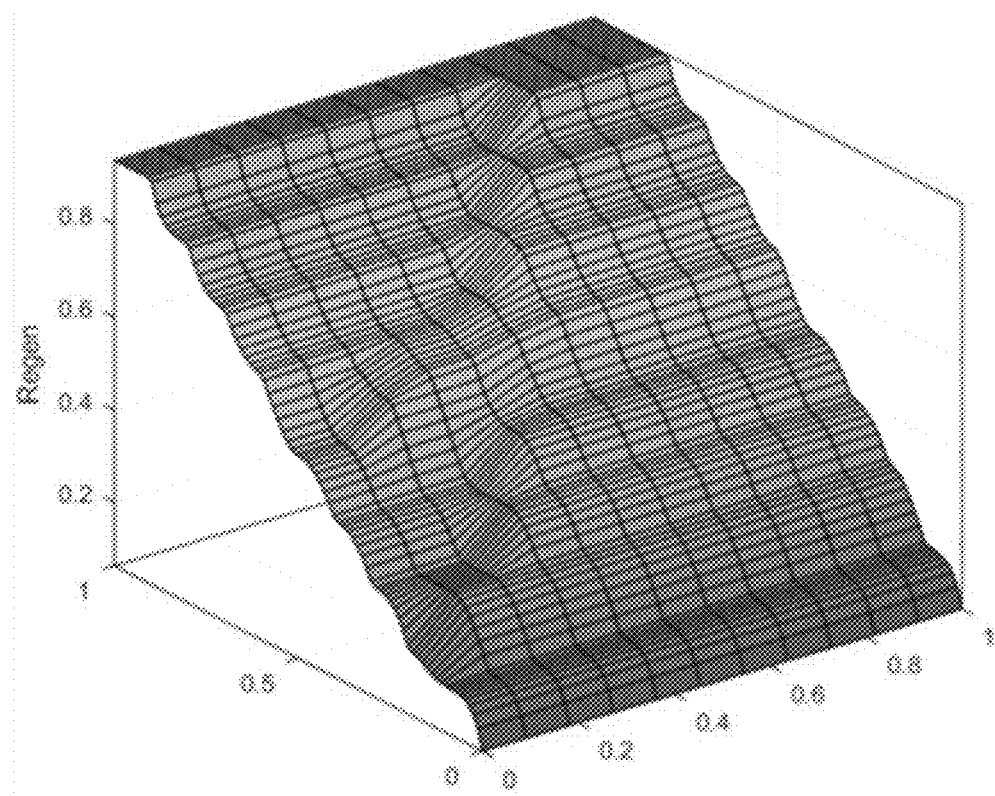
FIG. 5 is a graph illustrating regenerative braking values, obtained according to the brake force and the distance to the object and computed using a second fuzzy algorithm in an embodiment of the invention.

FIG. 5 is a graph illustrating regenerative braking values, obtained according to the brake force and the distance to the object and computed using a second fuzzy algorithm in an embodiment of the invention.

If an embodiment of the invention is utilized in an electric vehicle, for example, a more flexible regenerative braking value can be applied, compared to using a fixed regenerative braking value according to the related art, and the rate of power recovery provided by the regenerative braking can be increased.

Also, as the brake force applied can be varied according to the distance to the object, the probability of avoiding a collision can be increased as well.

Furthermore, as various braking scenarios are can be applied, the comfort of riding the vehicle can be improved.

Figure 6:
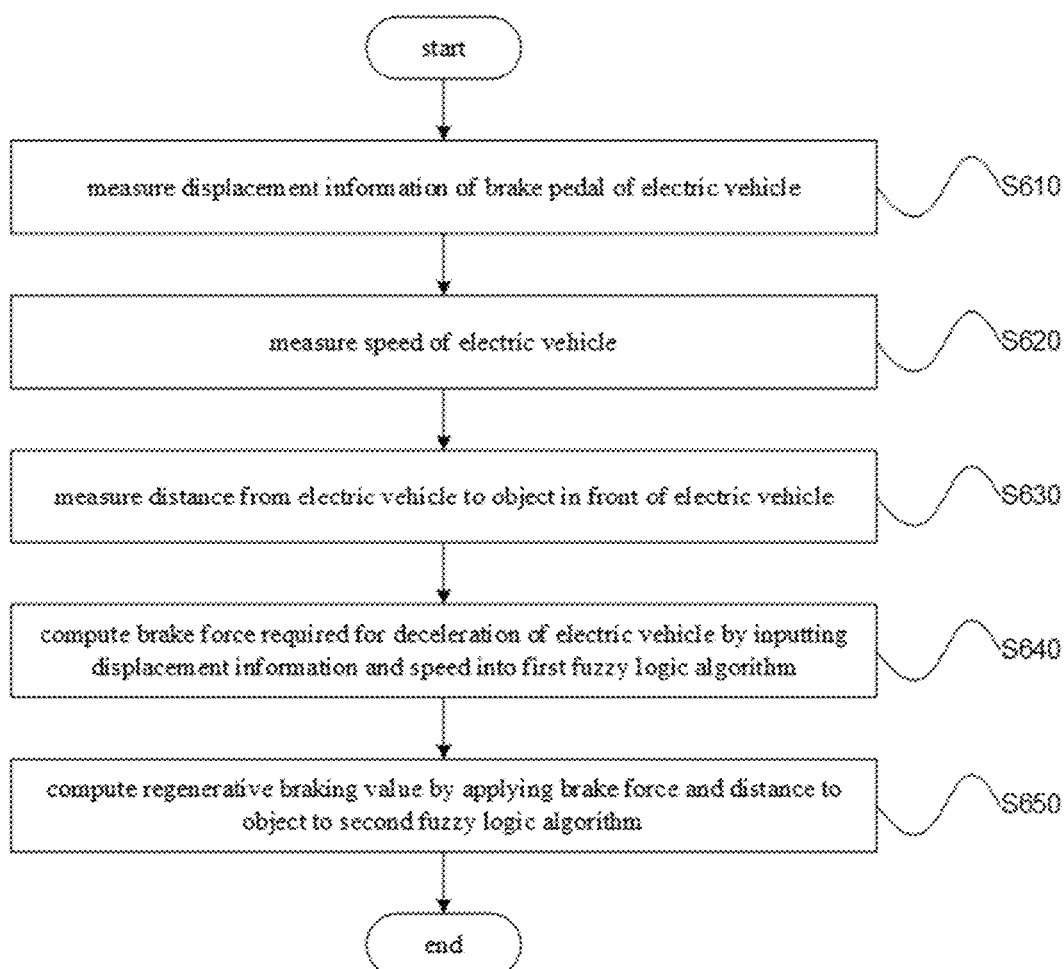
FIG. 6 is a flow diagram illustrating a method of setting a regenerative braking value according to an embodiment of the invention.

FIG. 6 is a flow diagram illustrating a method of setting a regenerative braking value according to an embodiment of the invention.

In operation S610, the displacement information of the brake pedal of the electric vehicle may be measured.

In operation S620, the speed of the electric vehicle may be measured.

In operation S630, the distance from the electric vehicle to an object in front of the electric vehicle may be measured.

In operation S640, the brake force required for decelerating the electric vehicle may be computed by inputting the displacement information and the speed into a first fuzzy logic algorithm.

In operation S650, the regenerative braking value may be computed by applying the brake force and the distance to the object to a second fuzzy logic algorithm.

A method of computing a regenerative braking value according to an embodiment of the invention is described above, where the features of the system 100 for computing a regenerative braking value described above with reference FIGS. 1 to 5 can be applied as is. Thus, further details on the above method are omitted.

Embodiments of the invention can be implemented in the form of program instructions that may be performed using various computer means and can be recorded in a computer-readable medium. Such a computer-readable medium can include program instructions, data files, data structures, etc., alone or in combination. The program instructions recorded on the computer-readable medium can be designed and configured specifically for the embodiment or can be a type known to and used by the skilled person in the field of computer software. A computer-readable medium may include a hardware device that is specially configured to store and execute program instructions. Some examples may include magnetic media such as hard disks, floppy disks, and magnetic tapes, optical media such as CD-ROM's and DVD's, magneto-optical media such as floptical disks, and hardware devices such as ROM, RAM, flash memory, etc. Examples of the program of instructions may include not only machine language codes produced by a compiler but also high-level language codes that can be executed by a computer through the use of an interpreter, etc. The hardware device mentioned above can be made to operate as one or more software modules that perform the actions of the embodiments, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

The invention claimed is:

1. A system comprising:
    a first measurer that measures displacement information associated with an angle of displacement of a brake pedal of an electric vehicle;
    a second measurer that measures a speed of the electric vehicle;
    a third measurer that measures a distance from the electric vehicle to an object in front of the electric vehicle;
    a first computation unit configured to compute a brake force required for a deceleration of the electric vehicle by inputting the displacement information and the speed into a first fuzzy logic algorithm;
    a second computation unit configured to:
        convert the brake force into a third fuzzy variable;
        convert the distance to the object into a fourth fuzzy variable;
        input the third fuzzy variable and the fourth fuzzy variable into a second fuzzy logic algorithm to compute a second fuzzy output therefrom by using a pre-inputted second fuzzy inference rule as shown in a following table:

| | brake force | | | | | | |
|---|---|---|---|---|---|---|---|
| distance | nb | ns | nm | ze | pm | ps | pb |
| nb | ns | ns | ns | ns | ns | ns | ns |
| ns | nm | nm | nm | nm | nm | nm | nm |
| nm | nm | ze | ze | ze | ze | ze | ze |
| ze | ze | ze | pm | pm | pm | pm | pm |

-continued

| | brake force | | | | | | |
|---|---|---|---|---|---|---|---|
| distance | nb | ns | nm | ze | pm | ps | pb |
| pm | pm | pm | pm | ps | ps | ps | ps |
| ps | ps | ps | ps | ps | pb | pb | pb |
| pb | pb | pb | pp | pb | pb | pb | pb | where 'brake force' represents a value of the brake force, 'distance' represents the distance to the object, 'nb' represents 'negative big', 'ns' represents 'negative small', 'nm' represents 'negative medium', 'ze' represents 'zero', 'pb' represents 'positive big', 'pm' represents 'positive medium', and 'ps' represents 'positive small'; and
    compute a regenerative braking value by way of a defuzzification of the second fuzzy output; and
    a brake system to apply the computed brake force to the electric vehicle with the computed regenerated braking value.

2. The system for setting a regenerative braking value according to claim 1, wherein the first computation unit computes the brake force by:
    converting the displacement information into a first fuzzy variable,
    converting the speed into a second fuzzy variable,
    inputting the first fuzzy variable and the second fuzzy variable into the first fuzzy logic algorithm to compute a first fuzzy output therefrom by using a pre-inputted first fuzzy inference rule, and
    computing the brake force by way of a defuzzification of the first fuzzy output.

3. The system for setting a regenerative braking value according to claim 1, wherein an x-axis of a membership function of the brake force has normalized values,
    said 'nb' for the brake force has a y value of 1 in a 0~0.1 section of the x-axis, a y value dropping from 1 to 0 in a 0.1~0.2 section of the x-axis, and a y value of 0 in a 0.2~1 section of the x-axis,
    said 'ns' for the brake force has a y value rising from 0 to 1 in a 0~0.1 section of the x-axis, a y value of 1 in a 0.1~0.4 section of the x-axis, a y value dropping from 1 to 0 in a 0.4~0.5 section of the x-axis, and a y value of 0 in a 0.5~1 section of the x-axis,
    said 'nm' for the brake force has a y value of 0 in a 0~0.2 section of the x-axis, a y value rising from 0 to 1 in a 0.2~0.3 section of the x-axis, a y value of 1 in a 0.3~0.5 section of the x-axis, a y value dropping from 1 to 0 in a 0.5~0.6 section of the x-axis, and a y value of 0 in a 0.6~1 section of the x-axis,
    said 'ze' for the brake force has a y value of 0 in a 0~0.3 section of the x-axis, a y value rising from 0 to 1 in a 0.3~0.4 section of the x-axis, a y value of 1 in a 0.4~0.6 section of the x-axis, a y value dropping from 1 to 0 in a 0.6~0.7 section of the x-axis, and a y value of 0 in a 0.7~1 section of the x-axis,
    said 'pm' for the brake force has a y value of 0 in a 0~0.4 section of the x-axis, a y value rising from 0 to 1 in a 0.4~0.5 section of the x-axis, a y value of 1 in a 0.5~0.7 section of the x-axis, a y value dropping from 1 to 0 in a 0.7~0.8 section of the x-axis, and a y value of 0 in a 0.8~1 section of the x-axis, said 'ps' for the brake force has a y value of 0 in a 0~0.5 section of the x-axis, a y value rising from 0 to 1 in a 0.5~0.6 section of the x-axis, a y value of 1 in a 0.6~0.8 section of the x-axis, a y value dropping from 1 to 0 in a 0.8~0.9 section of the x-axis, and a y value of 0 in a 0.9~1 section of the x-axis, and said 'pb' for the brake force has a y value of 0 in a 0~0.6 section of the x-axis, a y value rising from 0 to 1 in a 0.6~0.7 section of the x-axis, and a y value of 1 in a 0.7~1 section of the x-axis.

4. The system for setting a regenerative braking value according to claim 1, wherein an x-axis of a membership function of the distance to the object has normalized values, said 'nb' for the distance to the object has a y value of 1 in a 0~0.1 section of the x-axis, a y value dropping from 1 to 0 in a 0.1~0.2 section of the x-axis, and a y value of 0 in a 0.2~1 section of the x-axis, said 'ns' for the distance to the object has a y value rising from 0 to 1 in a 0~0.1 section of the x-axis, a y value of 1 in a 0.1~0.4 section of the x-axis, a y value dropping from 1 to 0 in a 0.4~0.5 section of the x-axis, and a y value of 0 in a 0.5~1 section of the x-axis, said 'nm' for the distance to the object has a y value of 0 in a 0~0.1 section of the x-axis, a y value rising from 0 to 1 in a 0.1~0.2 section of the x-axis, a y value of 1 in a 0.2~0.5 section of the x-axis, a y value dropping from 1 to 0 in a 0.5~0.6 section of the x-axis, and a y value of 0 in a 0.6~1 section of the x-axis, said 'ze' for the distance to the object has a y value of 0 in a 0~0.2 section of the x-axis, a y value rising from 0 to 1 in a 0.2~0.3 section of the x-axis, a y value of 1 in a 0.3~0.6 section of the x-axis, a y value dropping from 1 to 0 in a 0.6~0.7 section of the x-axis, and a y value of 0 in a 0.7~1 section of the x-axis, said 'pm' for the distance to the object has a y value of 0 in a 0~0.3 section of the x-axis, a y value rising from 0 to 1 in a 0.3~0.4 section of the x-axis, a y value of 1 in a 0.4~0.7 section of the x-axis, a y value dropping from 1 to 0 in a 0.7~0.8 section of the x-axis, and a y value of 0 in a 0.8~1 section of the x-axis, said 'ps' for the distance to the object has a y value of 0 in a 0~0.4 section of the x-axis, a y value rising from 0 to 1 in a 0.4~0.5 section of the x-axis, a y value of 1 in a 0.5~0.8 section of the x-axis, a y value dropping from 1 to 0 in a 0.8~0.9 section of the x-axis, and a y value of 0 in a 0.9~1 section of the x-axis, and said 'pb' for the brake force has a y value of 0 in a 0~0.5 section of the x-axis, a y value rising from 0 to 1 in a 0.5~0.6 section of the x-axis, and a y value of 1 in a 0.6~1 section of the x-axis.

5. A method comprising:

measuring displacement information associated with a displacement of a brake pedal of an electric vehicle;

measuring a speed of the electric vehicle;

measuring a distance from the electric vehicle to an object in front of the electric vehicle;

computing a brake force required for a deceleration of the electric vehicle by inputting the displacement information and the speed into a first fuzzy logic algorithm;

converting the brake force into a third fuzzy variable;

converting the distance to the object into a fourth fuzzy variable;

inputting the third fuzzy variable and the fourth fuzzy variable into a second fuzzy logic algorithm to compute a second fuzzy output therefrom by using a pre-inputted second fuzzy inference rule as shown in a following table:

|  |  | brake force | | | | | | |
|---|---|---|---|---|---|---|---|---|
|  |  | nb | ns | nm | ze | pm | ps | pb |
| distance | nb | ns | ns | ns | ns | ns | ns | ns |
|  | ns | nm | nm | nm | nm | nm | nm | nm |
|  | nm | nm | ze | ze | ze | ze | ze | ze |
|  | ze | ze | ze | pm | pm | pm | pm | pm |
|  | pm | pm | pm | pm | ps | ps | ps | ps |
|  | ps | ps | ps | ps | ps | pb | pb | pb |
|  | pb | pb | pb | pb | pb | pb | pb | pb | where 'brake force' represents a value of the brake force, 'distance' represents the distance to the object, 'nb' represents 'negative big', 'ns' represents 'negative small', 'nm' represents 'negative medium', 'ze' represents 'zero', 'pb' represents 'positive big', 'pm' represents 'positive medium', and 'ps' represents 'positive small';

computing a regenerative braking value by way of a defuzzification of the second fuzzy output; and applying the computed brake force to the electric vehicle with the computed regenerative braking value.

6. The method of claim 5, wherein an x-axis of a membership function of the brake force has normalized values, said 'nb' for the brake force has a y value of 1 in a 0~0.1 section of the x-axis, a y value dropping from 1 to 0 in a 0.1~0.2 section of the x-axis, and a y value of 0 in a 0.2~1 section of the x-axis, said 'ns' for the brake force has a y value rising from 0 to 1 in a 0~0.1 section of the x-axis, a y value of 1 in a 0.1~0.4 section of the x-axis, a y value dropping from 1 to 0 in a 0.4~0.5 section of the x-axis, and a y value of 0 in a 0.5~1 section of the x-axis, said 'nm' for the brake force has a y value of 0 in a 0~0.2 section of the x-axis, a y value rising from 0 to 1 in a 0.2~0.3 section of the x-axis, a y value of 1 in a 0.3~0.5 section of the x-axis, a y value dropping from 1 to 0 in a 0.5~0.6 section of the x-axis, and a y value of 0 in a 0.6~1 section of the x-axis, said 'ze' for the brake force has a y value of 0 in a 0~0.3 section of the x-axis, a y value rising from 0 to 1 in a 0.3~0.4 section of the x-axis, a y value of 1 in a 0.4~0.6 section of the x-axis, a y value dropping from 1 to 0 in a 0.6~0.7 section of the x-axis, and a y value of 0 in a 0.7~1 section of the x-axis, said 'pm' for the brake force has a y value of 0 in a 0~0.4 section of the x-axis, a y value rising from 0 to 1 in a 0.4~0.5 section of the x-axis, a y value of 1 in a 0.5~0.7 section of the x-axis, a y value dropping from 1 to 0 in a 0.7~0.8 section of the x-axis, and a y value of 0 in a 0.8~1 section of the x-axis, said 'ps' for the brake force has a y value of 0 in a 0~0.5 section of the x-axis, a y value rising from 0 to 1 in a 0.5~0.6 section of the x-axis, a y value of 1 in a 0.6~0.8 section of the x-axis, a y value dropping from 1 to 0 in a 0.8~0.9 section of the x-axis, and a y value of 0 in a 0.9~1 section of the x-axis, and said 'pb' for the brake force has a y value of 0 in a 0~0.6 section of the x-axis, a y value rising from 0 to 1 in a 0.6~0.7 section of the x-axis, and a y value of 1 in a 0.7~1 section of the x-axis.

7. The method of claim 5, wherein an x-axis of a membership function of the distance to the object has normalized values, said 'nb' for the distance to the object has a y value of 1 in a 0~0.1 section of the x-axis, a y value dropping from 1 to 0 in a 0.1~0.2 section of the x-axis, and a y value of 0 in a 0.2~1 section of the x-axis, said 'ns' for the distance to the object has a y value rising from 0 to 1 in a 0~0.1 section of the x-axis, a y value of 1 in a 0.1~0.4 section of the x-axis, a y value dropping from 1 to 0 in a 0.4~0.5 section of the x-axis, and a y value of 0 in a 0.5~1 section of the x-axis, said 'nm' for the distance to the object has a y value of 0 in a 0~0.1 section of the x-axis, a y value rising from 0 to 1 in a 0.1~0.2 section of the x-axis, a y value of 1 in a 0.2~0.5 section of the x-axis, a y value dropping from 1 to 0 in a 0.5~0.6 section of the x-axis, and a y value of 0 in a 0.6~1 section of the x-axis, said 'ze' for the distance to the object has a y value of 0 in a 0~0.2 section of the x-axis, a y value rising from 0 to 1 in a 0.2~0.3 section of the x-axis, a y value of 1 in a 0.3~0.6 section of the x-axis, a y value dropping from 1 to 0 in a 0.6~0.7 section of the x-axis, and a y value of 0 in a 0.7~1 section of the x-axis, said 'pm' for the distance to the object has a y value of 0 in a 0~0.3 section of the x-axis, a y value rising from 0 to 1 in a 0.3~0.4 section of the x-axis, a y value of 1 in a 0.4~0.7 section of the x-axis, a y value dropping from 1 to 0 in a 0.7~0.8 section of the x-axis, and a y value of 0 in a 0.8~1 section of the x-axis, said 'ps' for the distance to the object has a y value of 0 in a 0~0.4 section of the x-axis, a y value rising from 0 to 1 in a 0.4~0.5 section of the x-axis, a y value of 1 in a 0.5~0.8 section of the x-axis, a y value dropping from 1 to 0 in a 0.8~0.9 section of the x-axis, and a y value of 0 in a 0.9~1 section of the x-axis, and said 'pb' for the brake force has a y value of 0 in a 0~0.5 section of the x-axis, a y value rising from 0 to 1 in a 0.5~0.6 section of the x-axis, and a y value of 1 in a 0.6~1 section of the x-axis.

8. The method of claim 5, further comprising:

converting the displacement information into a first fuzzy variable;

converting the speed into a second fuzzy variable;

inputting the first fuzzy variable and the second fuzzy variable into the first fuzzy logic algorithm to compute a first fuzzy output therefrom by using a pre-inputted first fuzzy inference rule; and computing the brake force by way of a defuzzification of the first fuzzy output.

9. A non-transitory computer readable medium containing program instructions executed by a processor or controller, the program instructions when executed by the processor or controller configured to perform the method of claim 5.

\* \* \* \* \*